United States Patent [19]

Weber et al.

[11] Patent Number: 4,521,349
[45] Date of Patent: Jun. 4, 1985

[54] FLUID DIFFUSER FOR GASES AND LIQUIDS

[75] Inventors: Richard B. Weber; George M. Wilfley, both of Denver; George M. Wilfley, Castle Rock, all of Colo.

[73] Assignee: A. R. Wilfley and Sons, Inc., Englewood, Colo.

[21] Appl. No.: 459,343

[22] Filed: Jan. 20, 1983

[51] Int. Cl.³ .............................................. B01F 3/04
[52] U.S. Cl. .................................... 261/93; 209/169; 209/170; 210/219; 210/221.1; 261/87; 261/DIG. 7; 366/102; 366/103; 366/293; 366/296; 422/228; 435/315
[58] Field of Search ............... 261/93, 87, DIG. 7; 210/219, 221.2, 629, 631; 422/228, 231; 209/169, 170; 435/315; 366/101–103, 293, 296

[56] References Cited

U.S. PATENT DOCUMENTS

| | | | |
|---|---|---|---|
| 1,797,147 | 3/1931 | Imhoff et al. | 261/93 |
| 2,246,560 | 6/1941 | Weinig et al. | 261/93 |
| 2,615,698 | 10/1952 | Valentine | 261/93 |
| 3,017,951 | 1/1962 | Wiley | 261/93 X |
| 3,108,146 | 10/1963 | Gross | 261/87 X |
| 3,194,638 | 7/1965 | Neuville | 422/228 X |
| 3,525,437 | 8/1970 | Kaeding et al. | 210/221.2 |
| 3,630,498 | 12/1971 | Bielinski | 261/87 |
| 3,650,513 | 3/1972 | Werner | 261/87 |
| 3,867,488 | 2/1975 | Porterfield | 261/87 |
| 3,911,064 | 10/1975 | McWhirter et al. | 261/87 |
| 3,917,763 | 11/1975 | Schafer | 261/87 |
| 3,992,491 | 11/1976 | Ihrig et al. | 261/87 |
| 4,024,618 | 5/1977 | Kyrias | 29/157 C |
| 4,117,048 | 9/1978 | Stockner et al. | 261/93 |
| 4,193,950 | 3/1980 | Stockner et al. | 261/87 |
| 4,207,275 | 6/1980 | Stanton, Jr. et al. | 261/93 |
| 4,228,112 | 10/1980 | Hise | 261/87 |
| 4,231,974 | 11/1980 | Engelbrecht et al. | 261/87 |
| 4,271,127 | 6/1981 | Borner et al. | 261/93 X |
| 4,366,142 | 12/1982 | Kojima et al. | 422/228 X |

FOREIGN PATENT DOCUMENTS 15744  11/1956  Fed. Rep. of Germany ........ 261/87

Primary Examiner—Richard L. Chiesa
Attorney, Agent, or Firm—Clement and Ryan

[57] ABSTRACT

A fluid diffuser for dispersing a gas or liquid into a body of receiving liquid in which it is immersed. The diffuser includes a rotatable shaft, a thin disk-like member mounted for rotation on the shaft, and an annular ring positioned adjacent the outer perimeter of the disk-like member. At least one of the top and bottom walls of the annular ring is porous. These top and bottom walls define a fluid plenum, into which gas or liquid under pressure is introduced to be emitted from the plenum as small, nascent fluid spheroids on the surface of the annular ring. The boundary layer flow from rotation of the disk-like member within the body of receiving liquid shears fine gas bubbles or liquid particles from the foraminous surface or surfaces of the annular ring. The annular ring may be fixed, or rotatable in the opposite annular direction from the rotation of the disk. Impeller blades may be mounted on the top and/or bottom surfaces of the rotatable disk. The fluid diffuser is disclosed immersed in a flotation tank with a system of baffles to define a mixing zone at the bottom of the tank and a flotation zone at the top of the tank. Preferred embodiments of the diffuser include features to improve the mixing as well as diffusing action of the device.

39 Claims, 21 Drawing Figures

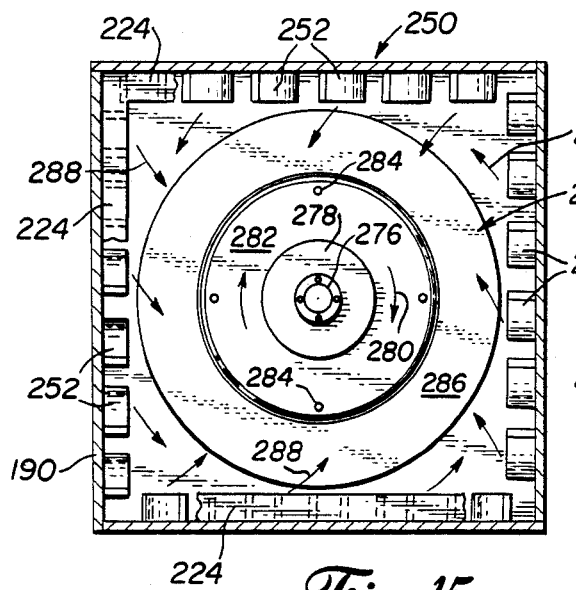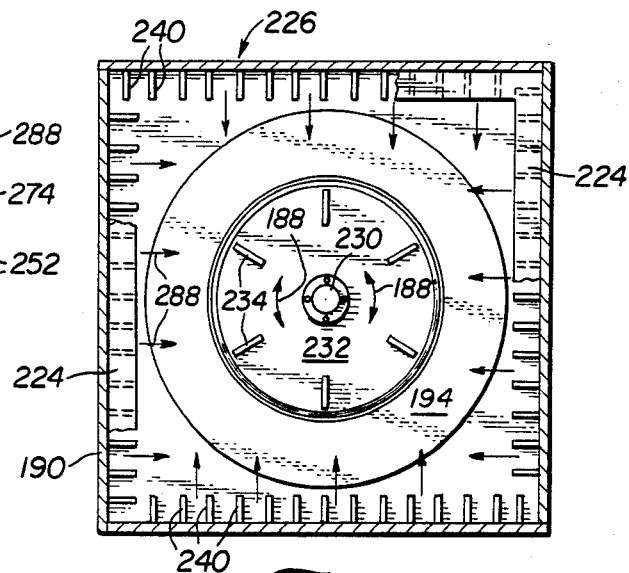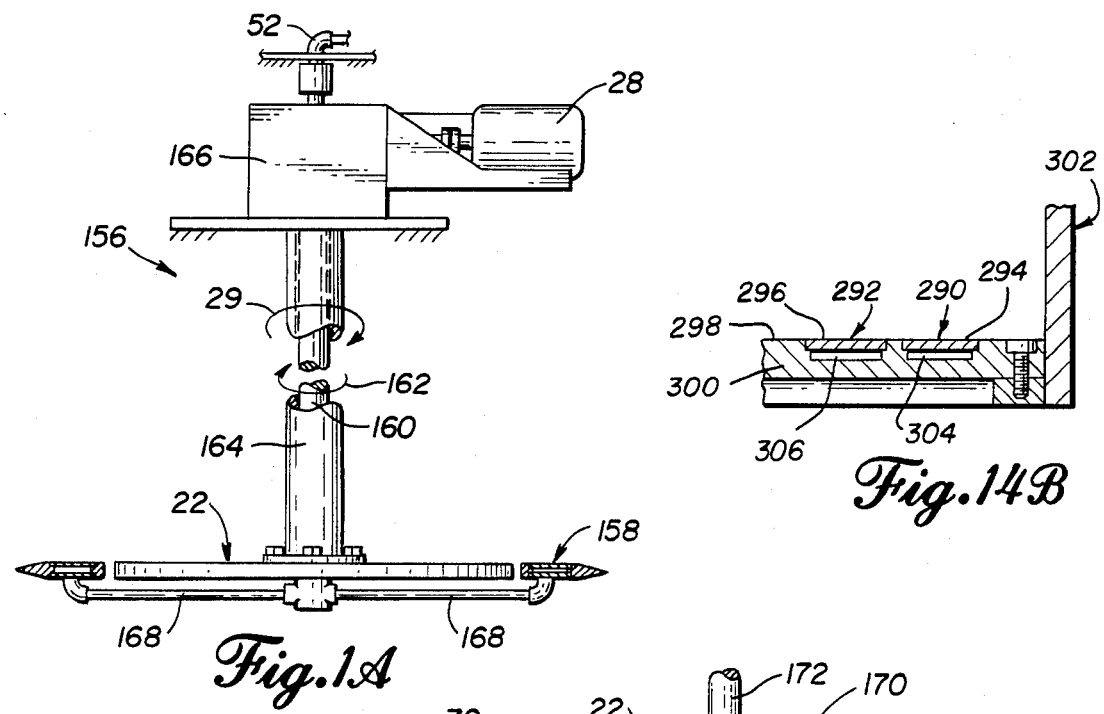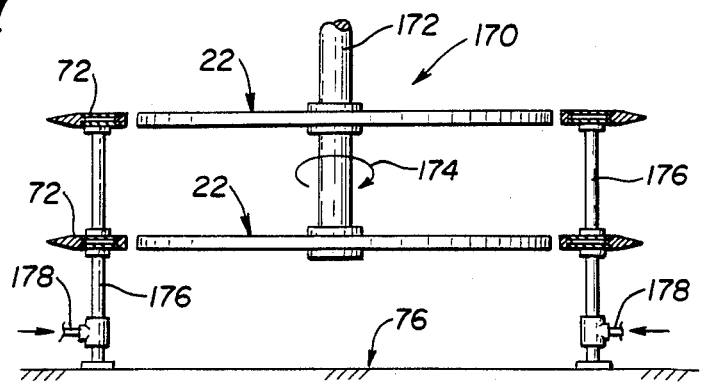

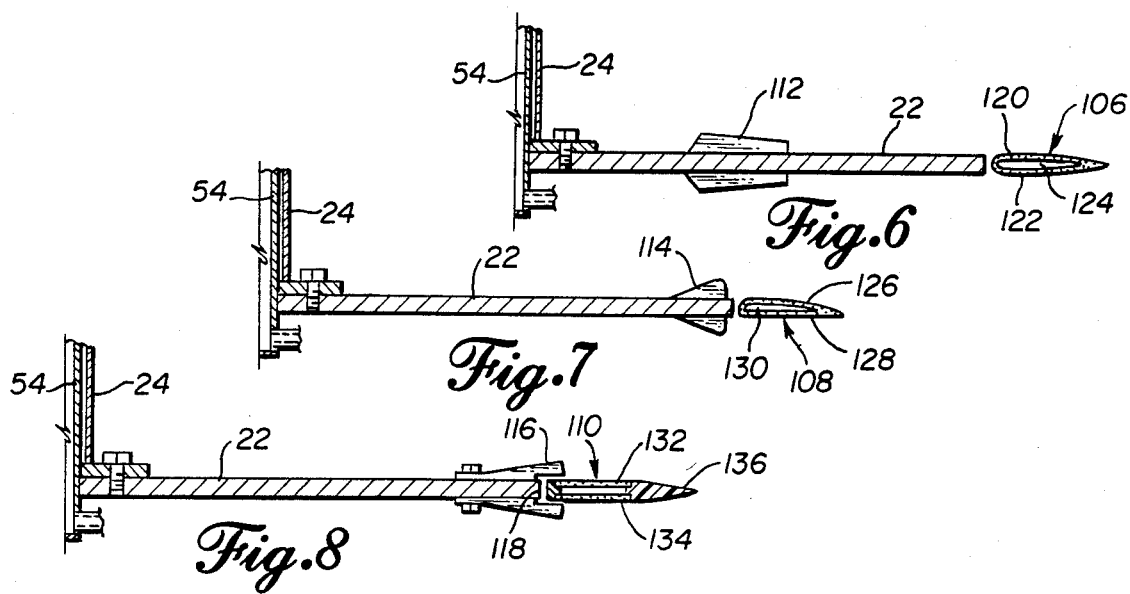
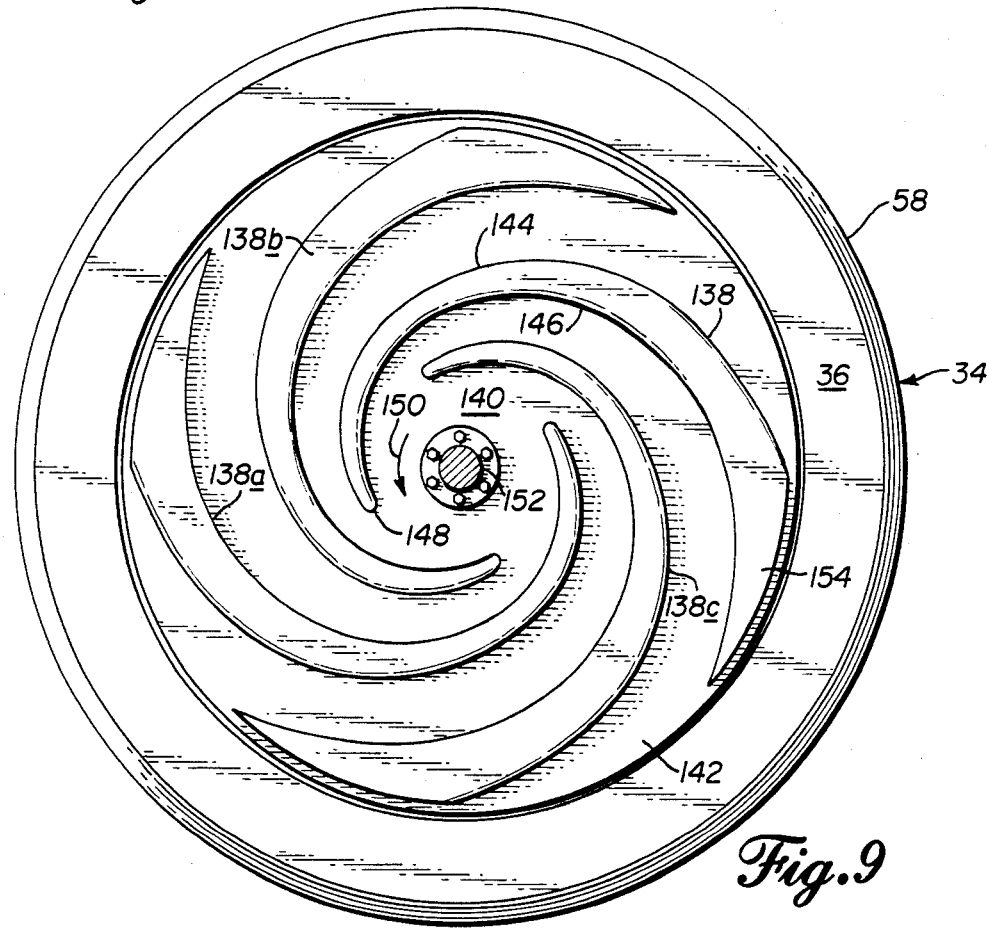
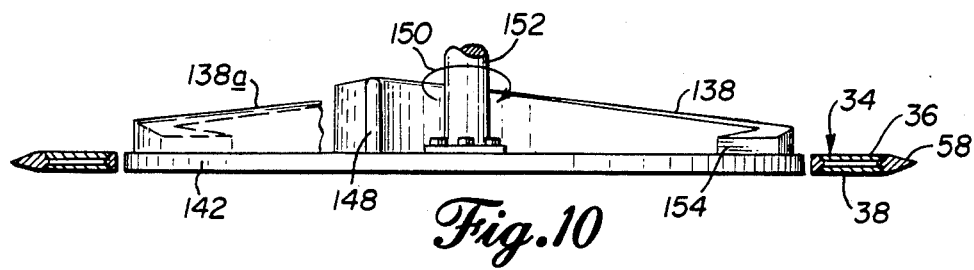

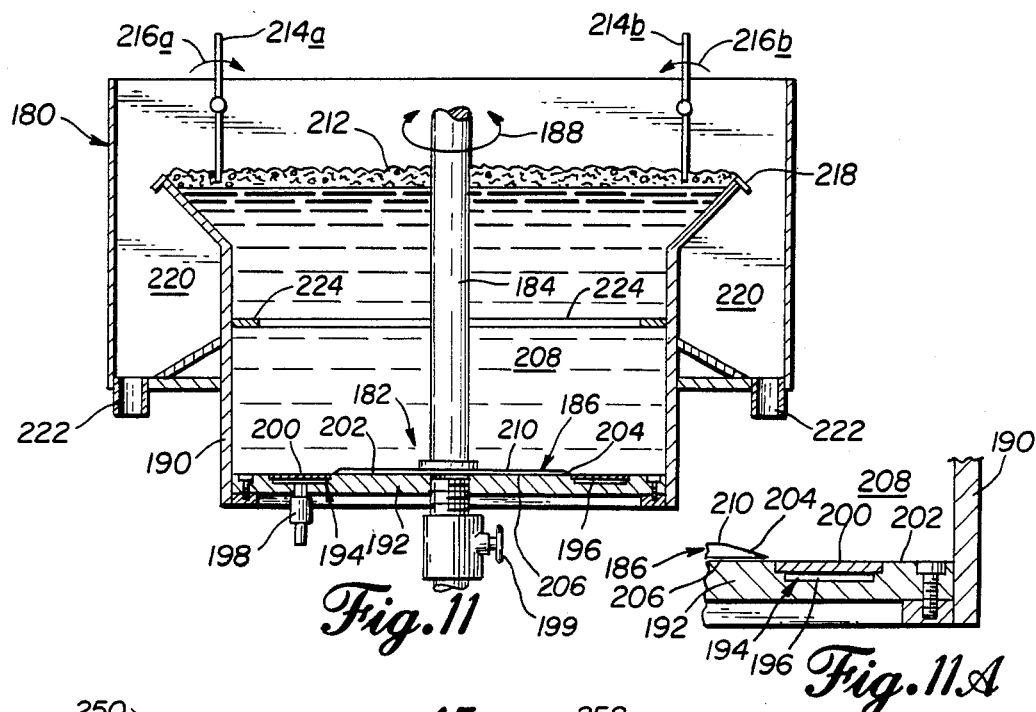
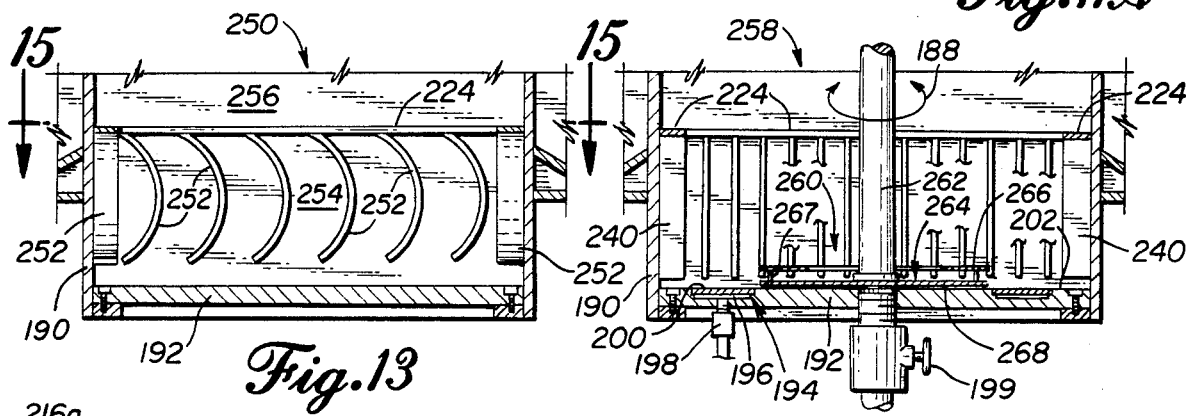
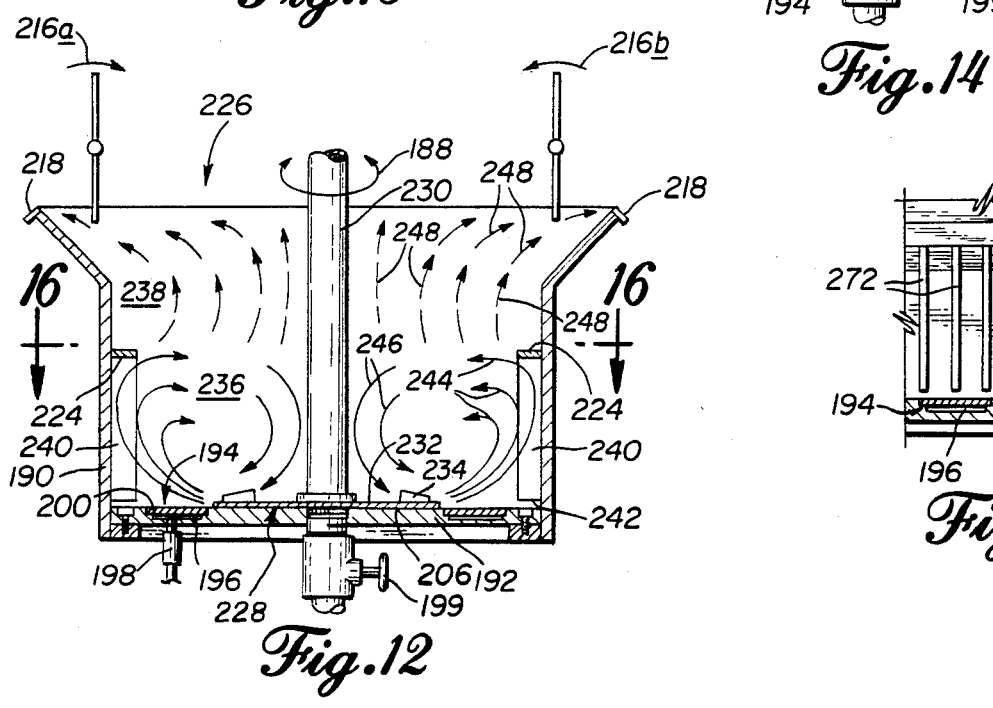

FLUID DIFFUSER FOR GASES AND LIQUIDS

FIELD OF INVENTION

This invention relates to a fluid diffuser for dispersing a gas or liquid into a body of receiving liquid in which the diffuser is immersed.

BACKGROUND OF THE INVENTION

There are many applications in various fields of technology in which diffusers are employed to produce gas bubbles having a very small diameter (measured in microns) to facilitate high rate dissolution of a gas in a liquid. Among these applications are (1) froth flotation for separation of minerals and non-minerals, (2) clarification of liquids for solids removal or unwanted gas removal, (3) aerobic and non-aerobic fermentation for production of pharmaceuticals or production of chemicals, (4) waste water and water treatment for carbonaceous removal, nitrification and disinfection, and (5) other gas-liquid reactions such as hydrocarbon oxidation, hydrogenation, pH control and beverage carbonation.

In addition to these gas-liquid reactions, there are many liquid-liquid reactions that require the dispersion of very fine droplets of liquid in a body of receiving liquid. Some examples of such reactions are (1) emulsion formation, (2) nitration converting an organic compound into a nitrate, and (3) polymerization.

These many and varied applications require bubbles or droplets of uniform diameter but in various size ranges to accomplish the desired result most efficiently and with the smallest amount of undissolved or unused gas or liquid. In most applications the smallest diameter bubble or droplet is preferred, but this is not true of all applications. Froth flotation is an example of a process in which changing the bubble size and gas flow rate is necessary to improve the yield of various particle size fractions and accommodate anionic or cationic flotation processes.

It is generally a requirement for all applications that the receiving body of liquid be a substantially uniform and homogenous mixture of gas bubbles or liquid droplets, suspended solids, and receiving liquid.

Gas diffusers are known for dispersing fine gas bubbles into a body of liquid that utilize apertures in a rotating impeller blade or sparging arm that is immersed in the receiving liquid, with gas emitted through the apertures in a wall or walls defining a gas plenum within the rotating blade or arm. In these devices, the apertured surface is typically oriented more or less parallel to the plane in which the blade or arm rotates as gas is fed through said apertures from the interior plenum. The holes in the surface out of which gas is emitted to be sheared off in the form of gas bubbles are relatively large in these patents, and thus the resulting gas bubbles are much larger than the bubbles that are produced by use of the apparatus of the present invention, and are much larger than are suitable for many applications. Examples of such prior art devices are the devices disclosed in U.S. Pat. Nos. 3,108,146, 3,867,488, 3,911,064, 3,917,763 and 4,231,974.

A second group of patents discloses somewhat similar devices that utilize gas emission from capillary surfaces on rotor blades, and thus the devices of these patents produce smaller bubbles than when larger apertures are employed as in the patents mentioned just above. This second group of patents includes U.S. Pat. Nos. 3,630,498, 3,650,513, 3,992,491, and 4,228,112. Because the capillary surfaces from which bubbles are sheared in these prior art patents rotate within the liquid in which the diffusing device is immersed, these patents not only do not teach or suggest the present invention, but actually lead away from it.

Some prior art patents produce bubble shearing by impelling streams of liquid through slots having walls that define very small openings or foramina. The walls may be made of sintered metal, ceramic or other material providing capillary openings out of which the gas to be sheared into fine bubbles can be emitted. These patents include U.S. Pat. Nos. 4,024,618, 4,117,048 and 4,193,950. Devices such as those disclosed in these patents produce quite fine gas bubbles, but introduce the bubbles at narrowly fixed locations in the liquid in which the diffusing device is immersed, and therefore do not achieve as thorough a distribution of the gas bubbles as can be produced by a rotating disk diffuser, and of course do not in any event suggest a device of the latter type.

Stanton et al. U.S. Pat. No. 4,207,275 discloses an apparatus for mixing a liquid with a gas that includes a rotating disk that directs the liquid in which the disk is immersed radially outward to pass over apertures or annular slots extending around the top surface of an annular sparge ring that surrounds the rotating disk. However, this patent shows no understanding of the importance of small openings such as are provided by a foraminous surface. It also shows no understanding of the importance of avoiding turbulence in the bubble formation zone in order to minimize coalescence of the gas bubbles that are sheared off whatever apertured or capillary surface is employed, and fails to provide any of the several important structural features that comprise the fluid diffuser of the present invention.

SUMMARY OF THE INVENTION

The apparatus of the present invention comprises a fluid diffuser for gases or liquids to produce fine gas bubbles or liquid droplets within the body of a receiving liquid when the diffuser is immersed within the latter liquid. The diffuser consists of two main elements—a rotatable disk-like member which imparts motion to the receiving liquid, and a separate porous annular ring that is supported in a position external to the rotatable disk and dispenses the gas or liquid to be distributed within the receiving liquid.

In every embodiment of the apparatus of this invention, the rotatable disk has a thin, flat shape. In order to reduce rotating friction or drag, the disk is made as thin as possible while maintaining structural integrity. The ratio of the overall diameter of the disk-like member to its maximum thickness is suitably at least about 8:1, and preferably much more.

The porous annular ring external to the rotatable disk-like member is typically mounted in a fixed position adjacent the outer perimeter of the disk-like member. However, if desired the annular ring may be mounted for rotation in the opposite annular direction from the direction of rotation of the disk-like member.

If a high rate of dissolution of the added fluid in the receiving liquid is the goal, no impeller blades or vanes are carried by the rotatable disk. However, if a thorough mixing of the added fluid with the receiving liquid is an objective, the disk may have low mixing vanes attached to its top or bottom surface, or to both, as desired. Most such impeller blades or vanes have a height that is preferably no more than about 1/40 to about 1/20 of the over-all diameter of the disk-like member. Preferred forms of impeller blades, when such blades are employed, are disclosed in this specification.

It is essential that the separate porous ring have a porous surface that has at least its inner portion located generally in the same plane as at least the outer portion of the top or bottom surface of the disk, and preferably substantially in that plane. A plurality of such porous surfaces may be utilized if desired, on the top and bottom walls of the ring.

Improved results are obtained if the annular ring has a thickness approximately equal to the rotating disk, and is located with its inner circumference as close as possible to the outer edge of the disk, and complementary in shape to that edge.

The described configuration of the rotating disk and porous annular ring located outside the disk permits boundary layer flow of the receiving liquid that is generated by the rotation of the thin disk to continue in a substantially uninterrupted path across the foraminous surface or surfaces of the porous ring, where it will shear off fine gas bubbles or small liquid droplets as the gas or liquid to be dispersed is emitted from the porous ring.

It is preferred that the annular foraminous area of the fluid diffusing ring be located as close to the outer perimeter of the rotating disk as is structurally possible, and extend outward a distance that will maximize the volume of fluid emitted through the surface without unduly reducing the shearing velocity of the outwardly moving boundary layer flow of liquid, or producing an undesirable level of coalescence between bubbles formed at the inner portion of the annular foraminous area with bubbles formed at the outer portions of the area.

The preferred vertical cross-section of the annular ring includes a tapering in thickness to a minimum dimension at the extreme outer edge of the ring, which minimizes turbulence and helps maintain laminar flow as the outwardly impelled receiving liquid carrying sheared fluid particles leaves the diffuser device. The vertical cross section of the annular ring may have the general shape of an air foil, if desired, in order to create a reduced pressure zone in the receiving liquid immediately adjacent the annular ring.

The fluid diffuser of this invention may be used to advantage in a flotation tank for the removal of small, suspended solid particles by the action of gas bubbles diffused through the body of liquid in which the particles are contained. The annular ring is recessed in the bottom wall of the tank, with its porous top surface in substantially the same plane as the top surface of the tank bottom wall. The boundary layer flow that provides the shearing force applied across the porous top surface of the annular ring may be generated by the bottom surface of the rotating disk-like member or by the top wall of such member if its outer periphery is tapered to a minimum dimension.

A plurality of generally vertically positioned elongated baffles adjacent the tank side walls, preferably with a horizontal baffle around the tank perimeter above said generally vertical baffles, substantially dissipates the mixing energy of the rotating disk-like member and causes the top portion of the body of liquid, and in particular the top surface thereof, to be maintained in a quiescent condition. The elongated baffles may be rectilinear or arcuate in cross-section.

ADVANTAGES OF THE INVENTION

Conventional rotating diffusers such as the prior art rotating diffusers discussed above, in which the porous medium through which fluid is introduced into the body of the receiving liquid is located on the rotating member itself, produce substantially larger gas bubbles or liquid droplets than does the fluid diffuser of this invention.

When a disk rotates in a liquid in which it is immersed, the drag of the rotating disk on the liquid adjacent to the disk produces a boundary layer flow at the top and bottom surfaces of the disk. The boundary layer flow contains a tangential component and a component directed radially outward that is created by centrifugal force. Since the rotating porous surface and the tangential component of boundary layer flow in the prior art devices in question tend to keep pace with each other as both pursue their circular courses, the tangential component does not move across the porous surface to contribute significantly to the shearing effect as the gas or other fluid to be dispersed is emitted through the porous surface. Thus, prior art disks with the porous medium located on the rotating member utilize primarily only the radially outward component, while the porous annular ring of this invention utilizes both the tangential component and the radially outward component, thereby creating additional shear velocity and producing smaller gas bubbles or liquid droplets.

Another beneficial feature of the present invention arises from the fact that wakes, eddies and spiraling jets are considerably reduced in both the embodiment of this invention that includes a stationary porous diffusion surface and the embodiment in which the porous surface rotates in the opposite direction from the disk-like member. With prior art rotating disks in which the porous medium is carried by the disk itself, a wake is created at the disk edge that in turn is transformed into a swirling jet that moves tangentially and radially away from the disk. The wake and jet constitute generally turbulent flow that causes bubble coalescence. In the present invention, when the annular ring external to the rotating disk-like member is stationary, there is no rotational motion between the porous ring edge and the immersed liquid. In the embodiment in which the annular ring rotates in the opposite angular direction to the direction of rotation of the disk-like member, the tangential liquid velocity components that are imparted to the boundary layer flow of the receiving liquid tend to cancel each other out. In either case, the radial liquid velocity component is not interrupted by the tangential velocity, and by the resulting increased turbulence, both of which are inherent in a disk that itself carries a porous rotating surface.

Still another beneficial feature of the present invention is the reduction in power required to produce the desired shearing force. When the porous ring does not rotate in the immersed liquid, there is no drag created by revolving the porous surface in the liquid. In other words, that embodiment of this invention utilizes a smaller diameter rotating member, and produces a considerable power saving for an equal volume of dissolved gas. When the annular ring rotates in the direction opposite to the rotation of the disk-like member, the speed of rotation of both members may be reduced to conserve power, while the relative velocity of the boundary layer flow across the surface of the porous ring is made higher than the velocity of the disk surface because of the additive effect of the ring velocity.

Conventional rotating gas diffusers require a rotating seal to transmit the pressurized gas to the rotating disk. The embodiment of the apparatus of this invention that includes a separate stationary diffusion ring eliminates the rotating seal, thereby permitting pressurized gas or liquid to be directly fed to the porous surface. Thus, a troublesome part is eliminated in this embodiment.

The present invention produces several surprising results: (1) unexpectedly efficient production of small micron size bubbles or droplets, (2) unexpected uniformity in diameter of sheared bubbles or droplets dispersed in the receiving liquid, (3) ease with which bubble or droplet diameter and the flow rate of the dispersed fluid can be varied to accommodate individual applications, (4) unexpectedly uniform mixing of bubbles or droplets within the receiving liquid, and (5) unexpectedly low power required to shear the bubbles or droplets and achieve a substantially uniform and homogenous mixture of gas bubbles or liquid droplets, suspended solids, and receiving liquid.

BRIEF DESCRIPTION OF DRAWINGS

The invention will now be described by reference to the drawings in this application, in which:

FIG. 1A (on the same sheet with FIGS. 15 and 16) is a similar view of another embodiment of the fluid diffuser of this invention in which the porous outer annular ring rotates in the opposite angular direction from that in which the disk-like member rotates;

FIG. 5A (on the same sheet with FIGS. 15 and 16) is a similar front elevation view of another embodiment of the fluid diffuser of this invention, which includes two parallel, thin, rotatable disk-like members with a stationary porous annular ring positioned adjacent the outer perimeter of each of said members;

FIGS. 6-8 are fragmentary sectional views, generally along the line 6,7,8 in FIG. 2, with the addition of several embodiments of the fluid diffuser of this invention exemplifying various types of impeller blades that may be mounted on the rotating disk-like member of the fluid diffuser of this invention, as well as porous outer annular rings of various cross-sectional shapes;

FIG. 9 is a sectional view similar to FIG. 2 of a fluid diffuser according to this invention, in which four specially formed impeller blades are carried on the top surface of the rotating disk-like member;

FIG. 10 is a fragmentary front elevation view of the fluid diffuser of FIG. 9, with one impeller blade shown in its entirety and the other three impeller blades either partially or totally omitted for clarity, with the porous outer annular ring shown for clarity in section in a plane passing through the axis of rotation of the rotatable disk-like member;

FIG. 11 is a sectional view taken through the center of a flotation tank in which one embodiment of the fluid diffuser of this invention is included;

FIG. 11A is an enlarged fragmentary view of a portion of the fluid diffuser and flotation tank of FIG. 11;

FIG. 12 is a vertical cross-section taken through the center of a flotation tank that includes another embodiment of the fluid diffuser of this invention, with generally vertical elongated baffle plates adjacent the tank side walls and horizontal baffle plates positioned above them, with the baffle plates adjacent the far side wall of the tank omitted for clarity;

FIG. 13 is a fragmentary sectional view, taken along a vertical plane near the far wall of a flotation tank that is employed with the fluid diffuser of this invention, which shows a plurality of generally vertical, arcuate, elongated baffle plates, together with horizontal baffle plates, extending along the side walls of the tank;

FIG. 14 is a vertical sectional view taken through the center of a flotation tank and a fluid diffuser according to this invention, the tank having elongated rectilinear baffle plates in generally vertical positions adjacent the side walls of the tank, together with horizontal baffle plates around the perimeter of the tank;

FIG. 14A is a fragmentary view of a flotation tank similar to the view in FIG. 14, but with horizontal baffles of triangular cross-section extending around the perimeter of the tank;

FIG. 14B is a fragmentary view of a flotation tank similar to the view in FIG. 14, but with two porous outer annular rings;

FIG. 15 is a sectional view of the flotation tank of FIG. 13, taken along line 15—15 in that Figure, showing the entire flotation tank and the associated fluid diffuser disposed therein, with the horizontal baffle plates largely omitted for clarity; and FIG. 16 is a sectional view of the flotation tank and fluid diffuser of FIG. 12, taken along the line 16—16 in that Figure, with the horizontal baffle plates largely omitted for clarity.

DETAILED DESCRIPTION OF SEVERAL EMBODIMENTS

Figure 1:
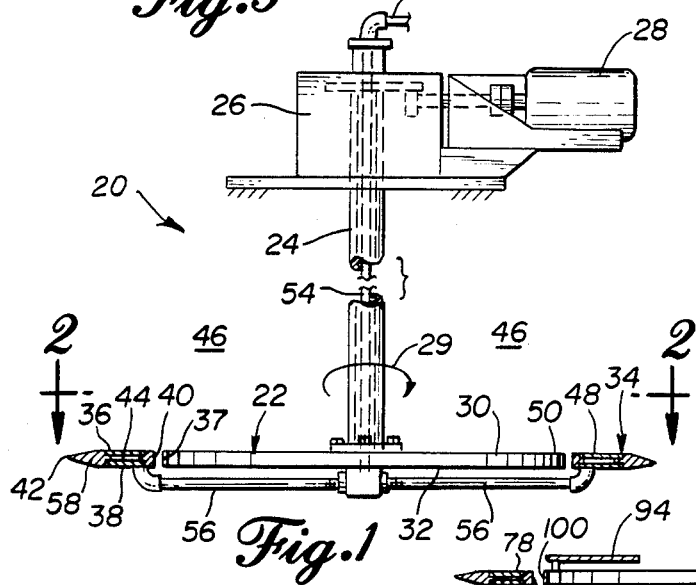
FIG. 1 is a front elevation view of one embodiment of the fluid diffuser of this invention, in which the porous outer annular ring is stationary, with the porous outer annular ring shown for clarity in section in a plane passing through the axis of rotation of the rotatable disk member.

FIG. 1 is a front elevation of fluid diffuser 20, constructed in accordance with this invention, for dispersing a gas or liquid into a body of receiving liquid in which the diffuser is emerged.

Thin disk-like member 22 is mounted for rotation on hollow rotatable shaft 24. Shaft 24 is driven by an arrangement of gears in gear box 26, which in turn is driven by motor 28. Arrow 29 indicates the direction of rotation of shaft 24 and therefore of disk-like member 22 carried by the shaft.

Disk-like member 22 is mounted perpendicularly to the axis of rotation of shaft 24. Top surface 30 and bottom surface 32 in the embodiment shown define parallel planes. The ratio of the overall diameter of disk-like member 22 to the maximum thickness thereof is at least about 8:1. Improved results are obtained if the indicated ratio is at least about 32:1, and it is preferred that it be at least about 128:1. Disk-like member 22 is preferably of solid construction and formed of an impervious material. Top surface 30 and bottom surface 32 of member 22 are preferably smooth.

Annular ring 34 is positioned adjacent outer perimeter 37 of disk-like member 22. (The ring is shown for clarity in section in a plane passing through the axis of rotation of the rotatable disk-like member.) Ring 34 includes top wall 36, bottom wall 38, inner circumference 40 and outer circumference 42. Top and bottom walls 36 and 38 define fluid plenum 44 between them. In the embodiment illustrated, a substantial portion of both top wall 36 and bottom wall 38 is porous, and the walls have foraminous surfaces to permit the passage of fluid through the walls to the outer surfaces of annular ring 34.

This construction permits the passage of fluids through top wall 36 and bottom wall 38 to the outer surfaces of annular ring 34, so that the introduction of fluids under pressure—whether gas or liquid—into plenum 44 will cause fluid to flow out through the porous walls. When disk-like member 22 rotates about its axis of rotation while immersed in a body of receiving liquid (indicated generally at 46 in FIG. 1) small nascent spheroids of fluid will be produced on the porous surfaces of annular ring 34 by the viscous shear forces exerted by liquid 46.

As seen, at least the inner portion 48 of the porous upper wall of plenum 44 lies in generally the same plane as at least the outer portion of top surface 30 on rotating disk-like member 22.

Figure 2:
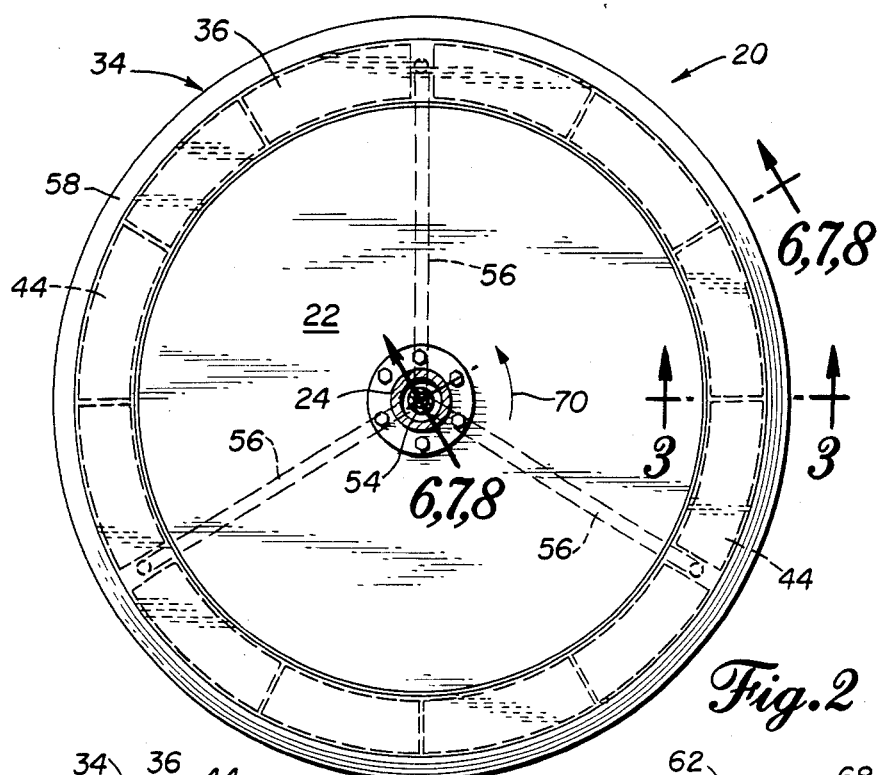
FIG. 2 is a somewhat enlarged sectional view of the fluid diffuser of FIG. 1, taken along line 2—2 in that Figure with the rotating disk-like member and the porous outer annular ring shown in plan.

Feed line 52 is in operative connection—through stationary hollow pipe 54 and hollow, Y-shaped, stationary pipe framework 56—with plenum 44 (FIGS. 1 and 2). During use of the fluid diffuser illustrated in FIG. 1, fluid is introduced under pressure into plenum 44 of ring 34, and from there into receiving liquid 46.

Top surface 36 of annular ring 34, which constitutes the foraminous surface of the top porous wall of plenum 44, is planar in form. It lies substantially in the same plane as top surface 30 of disk-like member 22, while surface is also planar. Bottom surface 38 of annular ring 34, which is the foraminous surface of the bottom porous wall of plenum 44, is planar and lies in substantially the same plane as the outer portion of bottom surface 32 of disk-like member 22, which is also planar.

In the embodiment shown, the thickness of inner portion 40 of annular ring 34 is substantially the same as the thickness of outer portion 37 of disk-like member 22. Inner circumference 40 of annular ring 34, which defines the inner portion of the annular ring, should lie as close to outer perimeter 37 of disk-like member 22 as is structurally possible consistent with free rotation of member 22. In the embodiment shown, the distance separating outer perimeter 37 of disk 22 and inner circumference 40 of ring 34 is exaggerated for clarity of illustration.

Best results are obtained if the foraminous gas diffusing area on surface 36 of annular ring 34, which is the external surface of upper wall of plenum 44 in the ring, is located as close to disk-like member 22 as is structurally feasible. It is also preferred that the adjacent surfaces 40 and 37 of the wall of the inner perimeter of annular ring 22 and the wall of the outer perimeter of disk-like member 34 be, as shown in FIG. 1, substantially complementary in shape.

Figure 3:
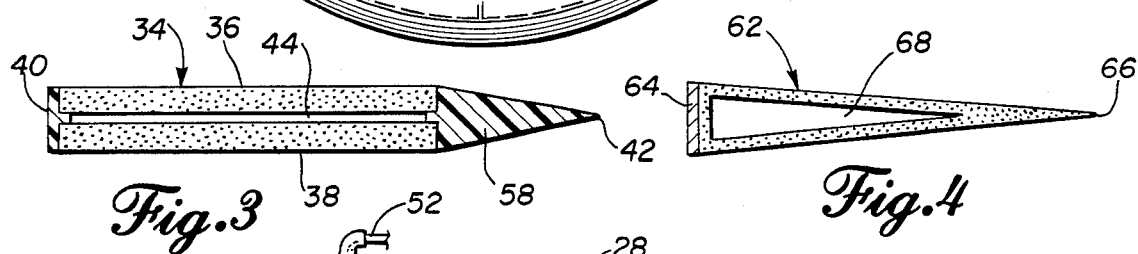
FIG. 3 is an enlarged sectional view of the annular ring of the embodiment of the fluid diffuser of this invention shown in FIG. 2, taken along line 3—3 in that Figure.

Good results are obtained with the vertical cross section of annular ring 34 as shown in FIG. 1, and in an enlarged view in FIG. 3, with the outer portion of the ring having a vertical cross section that tapers in thickness to a minimum dimension at outer circumference 42 of the ring. The taper described will minimize turbulence and maintain laminar flow as the outwardly impelled receiving liquid 46, carrying sheared fluid spheroids, leaves the diffuser device. It is further preferred that upper surface 36 and lower surface 38 of annular ring 34 inboard of the tapered outer portion 58 of the ring be planar and parallel to each other.

This arrangement of parts is shown in an enlarged view in FIG. 3, which is a sectional view taken along line 3—3 in FIG. 2 (which Figure is discussed below). As is seen, outer portion 58 of annular ring 34 has a vertical cross-section that tapers in thickness to a minimum dimension at outer circumference 42 of ring 34. Surfaces 36 and 38 inboard of outer portion 58 are planar and parallel to each other. The upper and lower walls that define surfaces 36 and 38, respectively, are formed of a porous material which permits fluid to be emitted from plenum 44 through the foraminous surfaces 36 and 38. Outer ring portion 58 and inner perimeter portion 40 may be formed of a suitable metal or hard plastic material.

FIG. 2 gives a somewhat enlarged sectional view of the gas diffuser of FIG. 1, with rotatable disk-like member 22 and porous outer annular ring 36 shown in plan. Rotatable disk-like member 22 is mounted for rotation on rotatable shaft 24. Arrow 70 indicates the direction of rotation of the shaft. Vertical pipe 54 supports the three arms 56 of the Y-shaped framework that in turn supports outer annular ring 34. As explained in connection with FIG. 1, fluid to be dispersed in the body of liquid in which the fluid diffuser of this invention is immersed is fed under pressure through feed line 54 and stationary auxiliary feed lines 56 into plenum 44 defined by upper wall 36 and lower wall 38 (as seen in FIG. 1) of annular wall 34.

As explained in connection with FIG. 1, surfaces 36 and 38 have substantial porous areas. Tapered outer perimeter portion 58 completes the annular ring.

Figure 4:
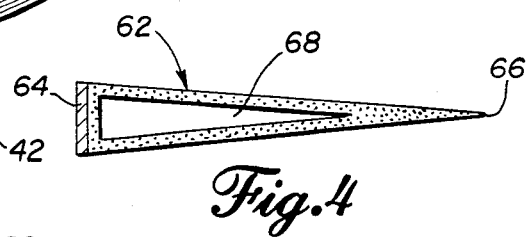
FIG. 4 is a similar sectional view of another embodiment of an annular ring that can be employed with the fluid diffuser of FIGS. 1 and 2 in place of the annular ring shown in FIGS. 1-3.

FIG. 4 is a vertical cross-sectional view of an alternative form of porous annular ring for use in the fluid diffuser of this invention. In this embodiment, annular ring 62 has a vertical cross-section that tapers in thickness continuously and uniformly from its inner circumference 64 to a minimum dimension, essentially zero, at its outer circumference 66.

Except for the circular framework 64 illustrated as forming the inner circumference of annular ring 62, which is formed of metal or a hard plastic, the remaining walls of ring 62 are porous, and define plenum 68.

FIG. 1A (on the same sheet with FIGS. 15 and 16) is a front elevation of another embodiment 156 of the fluid diffuser of this invention, in which porous outer annular ring 158, carried by hollow rotatable shaft 160, rotates in opposite angular direction 162 from direction 29 in which disk-like member 22, carried by hollow rotatable shaft 164, rotates. Shafts 160 and 164 are driven by gear box 166 (shown schematically), which in turn is driven by motor 28.

Feed line 52 is operatively connected, through hollow rotatable shaft 160, to the outwardly extending hollow arms 168 of the Y-framework that supports rotatable outer annular ring 158. Fluid is introduced under pressure through feed line 52, hollow shaft 160, and pipes 168 into the plenum (similar to plenum 44 in FIG. 1) within annular ring 158.

Figure 5:
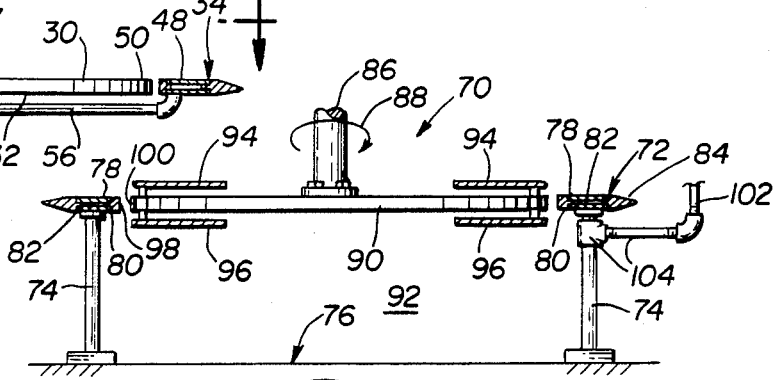
FIG. 5 is a fragmentary front elevation view of another embodiment of the fluid diffuser of this invention in which the stationary porous annular ring is supported on the bottom of the tank with which the fluid diffuser is employed, and in which the rotating disk-like member carries a pair of annular rings, one spaced above and the other below the disk with the porous outer annular ring and the pair of annular rings carried by the rotating disk all shown in section in a plane passing through the axis of rotation of the rotatable disk-like member.

FIG. 5 is a fragmentary front elevation view of another embodiment 70 of the fluid diffuser of this invention. In this embodiment, porous annular ring 72 is stationary, supported through posts 74 on bottom 76 of the tank with which the diffuser is employed. Ring 72 is shown for clarity in section in a plane passing through the axis of rotation of rotatable disk-like member 90.

Porous upper wall 78 and porous lower wall 80 of annular ring 72 define plenum 82 between them. Outer portion 84 of annular ring 72 has a triangular cross-section, tapering at its outer perimeter to a minimum vertical dimension.

Shaft 86 turns in angular direction 88 to rotate thin disk-like member 90 in the body of liquid, indicated generally at 92, in which it is immersed during use. Rotation of disk 90 produces boundary layer flow of liquid 92, which continues in a substantially uninterrupted path across the foraminous surfaces of walls 78 and 80 of annular ring 72.

In this embodiment, thin upper annular ring 94 and similar lower annular ring 96 are carried above and below disk member 90, secured to the disk to rotate with it as shaft 86 rotates. The effect of annular rings 94 and 96 is to help maintain regular, constant boundary layer flow radially outward from the top and bottom surfaces of disk 90, to flow radially outward across annular ring 72. Like porous outer annular ring 34, annular rings 94 and 96 are shown for clarity in section in a plane passing through the axis of rotation of rotatable disk-like member 90.

Wall 98 of the inner perimeter of annular ring 72 and wall 100 of the outer perimeter of disk-like member 90 are substantially complementary in shape. For best results, they should lie as close to each other as is structurally possible consistent with free rotation of disk-like member 90. As in FIG. 1, the distance separating walls 98 and 100 is exaggerated in FIG. 5 for clarity of illustration.

During use of the fluid diffuser of FIG. 5, fluid is introduced under pressure through hollow feed line 102. Line 102 connects through hollow pipes 104 with plenum 82 of stationary annular ring 72. The fluid to be dispersed through body of liquid 92 passes through the foraminous surfaces of porous walls 78 and 80 of plenum 82, to produce small nascent fluid spheroids on those foraminous surfaces. The outwardly directed boundary layer flow of receiving liquid 92 shears these spheroids off to form still finer particles of fluid for dispersion through the body of receiving liquid.

FIG. 5A (located on the same sheet as FIGS. 15 and 16) is a fragmentary front elevation view of another embodiment 170 of the fluid diffuser of this invention. In this embodiment, two thin, disk-like members 22 are attached to rotatable shaft 172, which is driven (by means not shown) in angular direction 174. Two parallel annular rings 72 are supported on stationary posts 176, which rest on tank bottom 76 in a manner generally similar to the arrangement shown in FIG. 5.

In this embodiment, posts 176 are hollow, and are in operative connection with feed lines 178, through which fluid is introduced under pressure into the plenum within each of annular rings 72. Rings 72 have porous top and bottom walls, as in the embodiment of FIG. 5.

In this embodiment, as the two disk-like members 22 are rotated, boundary layer flow occurs from the top and bottom surfaces of each disk, to be directed radially outward across the foraminous surfaces of the top and bottom walls of the two annular rings. Small gas bubbles or liquid particles are sheared off those foraminous surfaces by the outwardly directed boundary layer flow of the receiving liquid, as in the other embodiments previously discussed, but with an increased volume of fluid particles dispersed in the receiving liquid.

FIGS. 6 through 8 are fragmentary sectional views of several embodiments of the fluid diffuser of this invention. These figures illustrate various types of impeller blades that may be mounted on the rotating disk-like member of the fluid diffuser of this invention if an important objective is thorough mixing of the added fluid with the receiving liquid. If the primary objective is a high rate of dissolution of the added fluid in the receiving liquid, no impeller blades or vanes will ordinarily be carried by the rotatable disk.

The sectional views in FIGS. 6 through 8 are taken through thin disk-like member 22, carried by rotatable shaft 24, stationary vertical pipe 54, and outer annular rings 106, 108 and 110, respectively. In each Figure, one of a plurality of impeller blades is mounted on both the top and bottom surfaces of disk-like member 22. It is to be understood that additional impeller blades of the same respective configuration are located, spaced at equal angular distances, around the top and bottom surfaces of the disk member.

In every case, the height of each blade is no more than about 1/40 to about 1/20 of the overall diameter of the disk-like member. Preferably the height of these blades is no more than about 1/60 of that diameter. As will be seen, each of the blades extends across a series of circles concentric with the circumference of disk-like member 22.

Impeller blades 112 in FIG. 6 are located in the mid-portion of disk-member 22, part way between the center of the disk and its outer circumference. Impeller blades 114 in FIG. 7 are shown adjacent the outer circumference of disk member 22. Impeller blades 116 in FIG. 8 extend outward beyond outer circumference 118 of disk member 22 to overlie annular ring 110; in this embodiment, each blade 116 lies as close to ring 110 as is structurally possible consistent with free rotation of disk-like member 22.

FIGS. 6 through 8 also show other embodiments of the outer annular ring that may be employed in the fluid diffuser of this invention. In FIG. 6, the outer surfaces of top wall 120 and bottom wall 122 of ring 106, which define plenum 124, are each convex in shape. This produces a reduced pressure zone in the receiving liquid surrounding the fluid diffuser immediately adjacent the foraminous surfaces of walls 120 and 122, to increase the flow of fluid from plenum 124 for dispersion in the receiving liquid. In FIG. 7, the upper wall 126 and lower wall 128 of annular ring 108 define plenum 130 between them. In this embodiment, only upper wall 126 is convex in shape, and lower wall 128 is planar in form.

The top and bottom walls of annular rings 106 and 108 shown in FIGS. 6 and 7, respectively, are porous throughout. Annular ring 110 shown in FIG. 8, like annular ring 34 in FIG. 1, has upper wall 132 and lower wall 134 that are porous for a portion of their surface and impervious for the remainder. As with the annular ring of the embodiment of FIG. 1, annular ring 110 has an outer portion 136 that is triangular in cross-section, with a taper somewhat more gradual than the taper of outer ring 58 in FIGS. 1 through 3.

FIG. 9 illustrates an embodiment of the fluid diffuser of this invention in which a plurality of impeller blades 138 are mounted on the top surface 140 of thin disk-like member 142. In the embodiment shown, four blades 138 are carried on surface 140. Each of the blades extends across a series of circles concentric with the circumference of disk member 142, reaching from the inner portion of the disk to the outer portion thereof.

Each blade 138 has an elongated curved shape, with one side 144 convex in shape and the other side 146 concave in shape. The inner end 148 of each blade 138 faces in angular direction of rotation 150 of disk member 142, which is determined by the turning of rotatable shaft 152.

Blades 138 are shaped to increase the outward movement of the receiving liquid in the boundary layer flow caused by rotation of disk 142, while interfering as little as possible with the regular nature of that flow. In the embodiment illustrated in FIGS. 9 and 10, each curved impeller blade 138 extends through approximately three quadrants of circular disk member 142.

As best seen in FIG. 10, each impeller blade 138 has a maximum height at its inner end portion 148, and tapers throughout its length to a minimum height at its outer end portion 154. (In FIG. 10, for clarity only a portion of impeller blade 138a is shown, and impeller blades 138b and 138c are omitted altogether.) It is seen from the plan view of FIG. 9 that inner end portion 148 of each impeller blade 138 has a minimum width, and tapers throughout its length to a maximum width near its outer end portion 154.

The arrangement of impeller blades 138 shown in FIGS. 9 and 10 provides a very efficient means of producing a regular, constant boundary layer flow by moving a large volume of the receiving liquid at a high velocity. The maximum height of impeller blade 138 at its inner end 148 acts to embrace a relatively large volume of liquid and at the same time minimize spilling of the liquid over the blade as it "bites" into the liquid. The decreasing height of the impeller blade as the liquid moves radially outward from the center of disk member 142 permits the moving liquid to spill over at its outer edge, where the objective is to produce as much radial movement of the liquid, spread out over a large angular distance, as is possible.

The receiving liquid directed radially outward in the manner described has a very efficient shearing effect on the fluid emitted through porous walls 36 and 38 of outer annular ring 34.

FIG. 11 is a sectional view taken through the center of a flotation tank 180 in which one embodiment 182 of the fluid diffuser of this invention is included. Rotatable shaft 184, which carries thin disk-like member 186 mounted thereon, is driven by a gear motor or V-belts (not shown) in either angular direction 188. Float cell 190 includes bottom wall 192, in which porous annular ring 194 is recessed.

Annular hollow space 196, formed in bottom wall 192 of float cell 190 below annular ring 194, defines a plenum into which gas to be dispersed throughout the body of liquid in tank 180 is introduced under pressure through feed line 198. Float cell drain valve 199 is provided at the bottom of the tank.

Top surface 200 of ring 194 and top surface 202 of cell bottom 192 lie in substantially the same plane. Outer perimeter 204 of rotating disk member 186 has a tapered cross-section, as best seen in FIG. 11A. Bottom surface 206 of disk-like member 186 is positioned as close to the plane of top surface 202 of cell bottom 192 as is structurally possible, consistent with free rotation of the disk member.

The structural features described in the immediately preceding paragraph, including the tapering of outer portion 204 of disk 186 to a minimum dimension, produce boundary layer flow of receiving liquid 208 radially and tangentially outward along top surface 210 of the disk member and, at the outer perimeter of the disk, down along tapered surface 204. The gas introduced under pressure into plenum 196 is emitted through foraminous surface 200 of annular ring 194, to form fluid spheroids on that surface. The boundary layer flow of receiving liquid 208 then shears fine gas bubbles off foraminous surface 200 and disperses them in liquid 208.

Flotation tank 180 is used for the separation and removal of small solid particles—as, for example, of mineral ore—that are suspended in receiving liquid 208. During the operation of the tank, froth 212, with fine solid particles contained therein, rises to the top of body of liquid 208. Froth paddle 214a is rotated in angular direction 216a, and froth paddle 214b is rotated in opposite angular direction 216b, to move froth 212 across float cell wiers 218 and into float cell concentrate launder 220 surrounding float cell 190. From these spaces, the float cell concentrate is removed through launder outlets 222.

Horizontal baffle 224 is located in the vertical midsection of float cell 180, extending around the perimeter of the cell along the side walls thereof. This construction tends to keep the body of receiving liquid 208 divided into a lower mixing zone in which the fine gas bubbles sheared off top surface 200 of annular ring 194 are circulated vigorously, and an upper flotation zone in which the particles of gas, with fine solid particles entrained therewith, rise to the top to form froth 212 on the quiescent surface of the contents of the tank.

Flotation tank 180 illustrated in FIG. 11 is designed to be used in a batch process directed, for example, to the separation of fine particles of minerals from other particles of material to be discarded. The following steps are followed in a typical batch process employing a tank such as shown in FIG. 11:

1. A mixture of solid particles (pulp or feed) with reagents and foamers or frothers is introduced into the receiving liquid in tank 180. Disk-like member 186 is then rotated for, say, approximately two minutes.

2. Air is introduced into plenum 196, passes out through porous annular ring 194, and is sheared off top surface 200 of ring 194 in the form of fine gas bubbles. This step proceeds usually for up to about 15 minutes or somewhat more.

3. As the air flow proceeds, froth 212 comprised of air bubbles and entrained fine particles of minerals is paddled by paddles 214a and 214b off the top of the liquid contents of tank 180 over weirs 218 into launders 220, and is recovered as concentrate by removal through launder outlets 222.

4. After the passage of the desired time, drain valve 199 is opened to drain out the remaining body of receiving liquid 208 and precipitated tails or tailings.

Tank 180 can be modified, if desired, for use in a continuous flow process. In such case, the following steps may be followed:

1. Selected reagents and foamers or frothers are mixed in an external tank. The reagents employed will be chosen so as to selectively attach themselves to particles to be floated, or to particles to be precipitated, as the case may be. The purpose of the foamers or frothers is to float reagent-coated solid particles to the top of the flotation tank. In this first step:
   (a) The solid particles to be processed (in the form of pulp or feed) may be mixed in the external tank together with the reagents and foamers or frothers that are being mixed in that tank, and the resulting mixture introduced into the flotation tank; or
   (b) The solid particles to be processed may be added separately to the flotation tank through the same low inlet orifice through which the externally mixed reagents and foamers or frothers referred to above are introduced.

Either step (a) or (b) results in a continuous flow through the tank.

2. Air is introduced continuously through gas plenum 196 and porous annular ring 194.

3. Froth is paddled continuously off the top of the contents of the tank, to pass over the weirs and into the launders.

4. The tails or tailings are withdrawn continuously from an opening located low on the opposite side of the tank from the feed inlet aperture, which as stated above is also positioned at a low point in the tank. The level of liquid contents in the tank is maintained by a vertical weir in the outlet box, the top of which is located at the desired level for the liquid in the tank. At the same time, tails are drawn off cotinuously from the bottom of the outlet tank through a small outlet orifice.

FIG. 12 is a vertical cross-section taken through the center of a flotation tank 226 that includes another embodiment 228 of the fluid diffuser of this invention. In this embodiment, rotatable shaft 230 is driven in either angular direction 188, and carries with it thin disk-like member 232. Impeller blades 234 are mounted on the top surface of disk member 232, to assist in the outward boundary layer movement of the body of liquid in which the fluid diffuser is immersed.

As in the embodiment of FIG. 11, gas is introduced under pressure through feed line 198 into plenum 196 below porous annular ring 194. The outwardly directed boundary layer flow shears fine gas bubbles off foraminous top surface 200 of the annular ring, and directs them outward towards the side walls of float cell 190.

In FIG. 12, the body of receiving liquid is omitted for clarity from the drawing, with a number of arrows showing the circulation of the liquid within flotation tank 226. In this embodiment, horizontal baffle 224 again provides a boundary area between a lower mixing zone 236 and an upper flotation zone 238. Section line 16—16 in FIG. 12 provides an approximate boundary area between zones 236 and 238. (The horizonal baffle extending across the far wall of float cell 190 is also omitted in this Figure for clarity.)

Flotation tank 226 includes, in addition to horizontal baffle 224, a plurality of vertically oriented, elongated, rectilinear baffles 240 disposed around the outer periphery of float cell 190 adjacent each side wall thereof.

Each of these vertical baffles 240 has a bottom edge 242 that is oriented generally perpendicular to the adjacent side wall of cell 190, and is spaced above bottom wall 192 a short distance in relation to the height of the baffle. Each of these baffles extends upward to the approximate mid-portion of float cell 190.

Horizontal baffle 224 and vertical baffles 240 cooperate to influence the mixing action in lower portion 236 of cell 190, and the relatively calm upper portion 238 with a generally quiescent top surface on the body of liquid in the tank. The liquid in bottom portion 230, with fine gas bubbles and entrained solid particles contained therein, tends to follow the directions of flow indicated by arrows 244 and 246. In upper portion 238 of float cell 190, the receiving liquid, dispersed fine gas bubbles, and entrained solid particles tend to follow the directions of flow indicated by arrows 248.

FIG. 13 is a fragmentary sectional view, taken along a vertical plane near the far wall of flotation tank 250, which tank is employed with a fluid diffuser constructed according to this invention. Horizontal baffle plate 224 is again located in the vertical mid-portion of float cell 190, extending around the perimeter of the float cell adjacent the side walls thereof. A plurality of generally vertical, arcuate, elongated baffle plates 252 extends downward, from horizontal baffle plate 224 around the perimeter of the tank, to the vicinity of the tank bottom.

Each elongated baffle 252 has a vertical cross-section in the shape of an arc of a circle, with the curved cross-section of each baffle having substantially the same curvature as the other baffles. The convex side of each baffle faces in the same direction (to the right in FIG. 13), parallel to the adjacent tank side wall.

The cooperative action of horizontal baffle plate 224 and arcuate, elongated baffle plates 252 is generally similar to that of horizontal baffle plate 224 and baffle plates 240 in the embodiment of FIG. 12. However, it is believed that the circulating flow of receiving liquid, dispersed fine gas bubbles, and entrained solid particles and reagents, and the resulting mixing action, are somewhat more thorough in lower mixing portion 254 of float cell 190 before the contents of the tank tend to rise through upper flotation zone 256 than is the case with tank 226 illustrated in FIG. 12.

FIG. 14 provides a vertical sectional view taken through the center of flotation tank 258 and another embodiment 260 of the fluid diffuser of this invention. Rotatable shaft 262 is rotated in either angular direction 188, carrying with it thin disk-like member 264.

Disk member 264 carries thin annular ring 266 mounted on its upper surface to rotate with the disk member. Annular ring 266, spaced from and parallel to disk member 264, extends outward approximately to the outer circumference of the disk from a point located generally in the mid-portion thereof. It is supported on the disk member by four support posts 267 spaced equally around the disk.

Ring 266 provides additional boundary layer flow adjacent disk member 264 and renders the outwardly directed pumping action of the rotatable disk more uniform. In this embodiment, bottom surface 268 of disk member 264 is positioned as close to the plane of the top surface 202 of cell bottom 192 as is hydrodynamically feasible while accommodating boundary layer flow of the receiving liquid radially and tangentially outward along bottom surface 268. This boundary flow, reinforced by annular ring 266, shears fine gas bubbles off foraminous surface 200 of porous annular ring 194.

As in the embodiment of FIG. 12, flotation tank 258 includes a plurality of vertically oriented, elongated, rectilinear baffles 240 disposed around the outer perimeter of float cell 190 adjacent each side wall of the cell. Flotation tank 258 likewise contains horizontal baffle 224, which cooperates with vertical baffles 240 to produce the desired flow patterns within the lower and upper halves of float cell 190.

FIG. 14A is a fragmentary view of a flotation tank similar to that shown in FIG. 14, but with horizontal baffle 270 of triangular cross-section extending around the perimeter of float cell 190. Vertically oriented, rectilinear baffle plates 272 cooperate with horizontal baffle 270 to effect the desired flow patterns within the flotation tank.

FIG. 14B is a fragmentary view of a flotation tank similar to the view in FIG. 14, but with two porous outer annular rings 290 and 292. First porous annular ring 290 is spaced radially outward from second porous annular ring 292. Upper surfaces 294 and 296, respectively, of the two porous annular rings are foraminous and planar, lying in the same plane as top surface 298 of bottom wall 300 of flotation tank 302.

First porous annular portion 290 has a predetermined porosity that is different from the porosity of a second annular portion 292. In the embodiment shown, the porosity of portion 290 is greater than the porosity of portion 292.

Porous annular portions 290 and 292 define two fluid plenums, 304 and 306, respectively. Each of these plenums is separately fed from a different source of fluid (not shown). The ultimate source will be different if the fluids to be dispersed from the two plenums in receiving liquid 208 are to be different. If the fluid dispersed from the two plenums is to be the same fluid introduced at two different pressures, the ultimate source of the fluid may be different or it may be the same, with the fluid divided into two streams that are introduced into their respective plenums at different pressures.

As a result of the construction described, different fluids may be fed into plenums 304 and 306, respectively, to meet the requirements of particular processes for which flotation chamber 302 may be used. Likewise, the size of the gas bubbles or liquid droplets sheared from the foraminous surfaces 294 and 296 may be varied according to the requirements of the flotation process in question, by selection of porous annular portions 290 and 292 with different porosities, and/or by varying the pressure or rate of flow of fluid into separate fluid plenums 304 and 306 and out through porous walls 290 and 292, respectively.

It will be understood that the size of the gas bubbles or liquid droplets sheared from the outer annular ring of the fluid diffuser of this invention may also be varied by varying the speed of rotation of the inner disk-like member in a manner known to those skilled in the art. With greater speeds of rotation of the disk, the resulting bubbles or droplets diffused into the body of receiving liquid will ordinarily be of smaller size.

FIG. 15 is a sectional view of the flotation tank of FIG. 13, taken along line 15—15 in that Figure. The entire flotation tank 250 and associated fluid diffuser 274 disposed therein are shown, with horizontal baffle plate 224 largely omitted for clarity.

Rotatable shaft 276, carrying thin disk-like member 278, rotates in angular direction 280. As with the fluid diffuser illustrated in FIG. 14, thin annular plate 282 is mounted on disk 278, parallel thereto and spaced therefrom, supported by four posts 284 the tops of which are seen in FIG. 15. Porous annular outer ring 286 is positioned immediately outward of rotating disk 278.

Generally vertically oriented, elongated, arcuate baffle plates 252 cooperate with horizontal baffle plate 224 to direct the flow of liquid within flotation tank 250. The convex side of arcuate baffle plates 252 that are seen in the upper portion of FIG. 15 face to the right in that Figure, as they do in FIG. 13. Since the concave side of arcuate baffle plates 252 thus faces to the left, the direction of flow of the contents of the tank is reversed as one moves from the bottom to the top of tank 250. Thus, the general direction of flow of liquid at the bottom of the tank is clockwise in FIG. 15, while at the surface of the liquid it is counterclockwise, as indicated by arrows 288. The direction of flow as seen in plan view in FIG. 15 is similarly influenced around the perimeter of the tank by the positioning of the other arcuate baffle plates 252.

FIG. 16 is a sectional view of the flotation tank and fluid diffuser of FIG. 12, taken along the line 16—16 in the latter Figure. Horizontal baffle plate 224 is largely omitted for clarity.

Rotatable shaft 230, carrying thin disk-like member 232, rotates in either angular direction 188. Impeller blades 234 are mounted on the top surface of disk 232. Porous annular ring 194 lies outward of disk 232.

In addition to horizontal baffle 224, flotation tank 226 includes a plurality of vertically oriented, elongated, rectilinear baffles 240 disposed around the outer perimeter of float cell 190 adjacent each side wall thereof.

Horizontal baffle 224 and vertical baffles 240 cooperate to influence the mixing action in the lower portion of cell 190. The general movement of the receiving liquid, fine air bubbles dispersed therein, and fine mineral particles entrained in the bubbles is represented in plan view by arrows 288, which correspond to arrows 244 shown in elevation in FIG. 12.

The above detailed description of this invention has been given for clarity of understanding only. No unnecessary limitations are to be understood therefrom, since modifications will be obvious to those skilled in the art.

We claim:

1. A fluid diffuser for dispersing a gas or liquid into a body of receiving liquid in which it is immersed, which comprises:
    (a) a rotatable shaft;
    (b) a thin disk-like member mounted for rotation on said rotatable shaft perpendicular to the axis of rotation thereof, said disk-like member having a top surface, a bottom surface, an outer circumferential surface connecting said top and bottom surfaces and having an outer perimeter, the ratio of the overall diameter of said member to the maximum thickness thereof being at least about 8:1;
    (c) a separate stationary fluid-emitting annular ring positioned adjacent but spaced outwardly from the outer perimeter of said disk-like member, said ring having a top wall, a bottom wall, an inner circumference and an outer circumference, said top and bottom walls defining at least one fluid plenum, at least one of said top and bottom walls of said annular ring being porous in at least a portion thereof, with a foraminous surface to permit the passage of fluid through said wall to the outer surface of said ring so that the introduction of fluid into said plenum will cause fluid to flow out through said porous wall to produce small nascent fluid spheroids on said foraminous surface of the annular ring, which nascent spheroids are sheared off to form still finer particles of fluid by the viscous shear forces exerted by said liquid when said disk-like member rotates about its axis of rotation while immersed in said body of receiving liquid, at least the inner portion of the foraminous surface of said at least one porous wall of said at least one plenum lying in generally the same plane as at least the outer portion of the corresponding one of the top and bottom surfaces of said disk-like member; and (d) a feed line in operative connection with said plenum for fluid to be introduced under pressure into said at least one plenum of said annular ring and from there into the body of receiving liquid as aforesaid.

2. The fluid diffuser of claim 1 in which the ratio of the overall diameter of said disk-like member to the maximum thickness thereof is at least about 32:1.

3. The fluid diffuser of claim 1 in which the ratio of the overall diameter of said disk-like member to the maximum thickness thereof is at least about 128:1.

4. The fluid diffuser of claim 1 in which at least the inner portion of the surface of said at least one porous wall of said at least one plenum of said fluid-emitting annular ring lies in substantially the same plane as at least the outer portion of the corresponding one of the top and bottom surfaces of said disk-like member.

5. The fluid diffuser of claim 4 in which the ratio of the overall diameter of said disk-like member to the maximum thickness thereof is at least about 32:1.

6. The fluid diffuser of claim 4 in which the ratio of the overall diameter of said disk-like member to the maximum thickness thereof is at least about 128:1.

7. The fluid diffuser of claim 4 in which the thickness of the inner portion of said annular ring is substantially the same as the thickness of the outer portion of said disk-like member.

8. The fluid diffuser of claim 4 in which the adjacent surfaces of the wall of the inner perimeter of said fluid-emitting annular ring and the wall of the outer perimeter of said disk-like member are substantially complementary in shape.

9. The fluid diffuser of claim 5 which includes at least one additional thin disk-like member mounted for rotation on said rotatable shaft perpendicular to the axis of rotation thereof, said second disk-like member having dimensions similar to those of said first mentioned disk-like member and spaced therefrom, and a second fluid-emitting annular ring similar to said first annular ring positioned adjacent the outer perimeter of said second disk-like member.

10. The fluid diffuser of claim 4 in which the inner circumference of said fluid-emitting annular ring lies as close to the outer perimeter of said disk-like member as is structurally possible consistent with free rotation of said disk-like member.

11. The fluid diffuser of claim 10 in which the foraminous gas diffusing area on the outer surface of said at least one of said upper and lower walls of the plenum in said fluid-emitting annular ring is located as close to said disk-like member as is structurally feasible.

12. The fluid diffuser of claim 4 in which the outer portion of said fluid-emitting annular ring has a vertical cross-section that tapers in thickness to a minimum dimension at the outer circumference of the ring, whereby turbulence is minimized and laminar flow is maintained as the outwardly impelled receiving liquid carrying sheared fluid particles leaves the diffuser device.

13. The fluid diffuser of claim 12 in which said upper and lower surfaces of said fluid-emitting annular ring inboard of said outer portion are parallel to each other.

14. The fluid diffuser of claim 12 in which said fluid-emitting annular ring has a vertical cross section that tapers in thickness continuously from its inner circumference to a minimum dimension at its outer circumference.

15. The fluid diffuser of claim 14 in which said fluid-emitting annular ring has a vertical cross section that tapers uniformly from its inner circumference to a minimum dimension at its outer circumference.

16. The fluid diffuser of claim 12 in which the vertical cross-section of said fluid-emitting annular ring has the general shape of an air foil, with the surface of at least one of said top and bottom walls of the ring being convex in shape, whereby a reduced pressure zone will be created in the receiving liquid immediately adjacent said surface to increase the flow of fluid from said fluid plenum to be dispersed in said receiving liquid.

17. The fluid diffuser of claim 16 in which the outer surface of said top wall of said fluid-emitting annular ring is convex in cross section and said wall is porous in at least a portion thereof.

18. The fluid diffuser of claim 17 in which the outer surface of said bottom wall of said fluid-emitting annular ring is planar.

19. The fluid diffuser of claim 16 in which the outer surfaces of both the top and bottom walls of said fluid-emitting annular ring are convex in cross section.

20. The fluid diffuser of claim 19 in which each of said top and bottom walls is porous in at least a portion thereof.

21. The fluid diffuser of claim 4 in which a plurality of impeller blades is mounted on at least one of said top and bottom surfaces of said disk-like member, each of said blades extending across a series of circles concentric with the circumference of the disk-like member, the heights of each of said blades being no more than about 1/40 to about 1/20 of the overall diameter of said disk-like member whereby mixing of said receiving liquid and said fluid dispersed therein is increased.

22. The fluid diffuser of claim 21 in which at least two of said impeller blades extend outward beyond the outer circumference of said disk-like member to overlie said fluid-emitting annular ring, each of said blades lying as close to said ring as is structurally possible consistent with free rotation of said disk-like member.

23. The fluid diffuser of claim 21 in which the height of said impeller blades is no more than about 1/60 of the overall diameter of said disk-like member.

24. The fluid diffuser of claim 5 in which a plurality of impeller blades is mounted on the top surface of said disk-like member, each of said impeller blades having an elongated curved shape, with one side of the blade convex in shape and the other concave, each of said blades extending from the inner portion of said disk-like member to the outer portion thereof, with the inner end of said blade facing in the angular direction of rotation of said disk-like member.

25. The fluid diffuser of claim 24 in which each of said curved impeller blades extends through approximately three quadrants of said disk-like member.

26. The fluid diffuser of claim 24 in which the inner end portion of each of said curved impeller blades has a maximum height and the blade tapers throughout its length to a minimum height at its outer end portion.

27. The fluid diffuser of claim 24 in which the inner end portion of each of said curved impeller blades has a minimum width and the blade tapers throughout its length to a maximum width near its outer end portion.

28. The fluid diffuser of claim 1 in which said body of liquid is contained in a tank having a bottom wall in which said fluid-emitting annular ring is recessed, with its top surface lying in substantially the same plane as the plane of the top surface of said bottom wall.

29. The fluid diffuser of claim 28 in which the bottom surface of said disk-like member is located as close to said plane of the top surface of the bottom wall of said tank as is structurally possible consistent with free rotation of the disk-like member and the cross-section of the outer portion of said disk-like member is tapered to a minimum dimension to produce boundary layer flow of said receiving liquid radially and tangentially outward along the top surface of the disk-like member to shear fine fluid spheroids off the foraminous surface of the porous top wall of said annular ring.

30. The fluid diffuser of claim 4 in which said body of receiving liquid is contained in a flotation tank having an outer perimeter, said rotatable, thin disk-like member being located adjacent the bottom of said tank, said tank having a horizontal baffle extending substantially around said tank adjacent the side walls thereof and positioned in the vertical mid-portion of the tank spaced above said rotatable disk-like member, said baffle extending inward a minor fraction of the radius of said thin disk-like member, whereby the mixing energy of the rotating disk-like member is substantially dissipated and the surface of said body of liquid is maintained in a quiescent condition.

31. The fluid diffuser of claim 30 in which said horizontal baffle is triangular in cross-section, and has a top wall sloping downward and outward from the adjacent tank side wall and a bottom wall sloping upward and outward from said side wall.

32. The fluid diffuser of claim 30 in which said flotation tank includes a plurality of generally vertically oriented, elongated baffles disposed around said outer perimeter adjacent each side wall of said tank, each of said generally vertical baffles having its bottom edge oriented generally perpendicular to the adjacent side wall of the tank and spaced above the bottom wall of the tank a short distance in relation to the height of the baffle and extending upward to the approximate midportion of the tank.

33. The fluid diffuser of claim 32 in which each of said elongated baffles is rectilinear in cross-section.

34. The fluid diffuser of claim 32 in which each of said elongated baffles has a vertical cross-section in the shape of an arc of a circle, with the curved cross-section of each baffle having substantially the same curvature as the others of said baffles, the convex side of each baffle facing in the same direction parallel to the adjacent tank side wall.

35. The fluid diffuser of claim 5 which includes at least one thin annular ring mounted on said disk-like member spaced from and parallel to the same, said annular ring having a substantially circular inner opening, said annular ring extending outward approximately to the outer circumference of the disk-like member from a point located generally in the mid-portion of the disk-like member,
   each of the upper and lower surfaces of said annular ring mounted on the disk-like member being substantially planar and smooth from one outer edge portion to the opposite outer edge portion, the space between said disk-like member and said annular ring being free of any impeller blades mounted on either of said two members,
   to provide additional boundary layer flow adjacent the disk-like member and to render the outwardly directed pumping action of the rotatable disk-like member more uniform.

36. The fluid diffuser of claim 35 which includes a second thin annular ring having a shape and dimensions similar to those of said first mentioned annular ring and mounted on said disk-like member spaced from and parallel to said disk-like member, on the other side of said disk-like member from said first annular ring, the space between said disk-like member and said second annular ring being free of any impeller blades mounted on either of said two members.

37. The fluid diffuser of claim 1 in which:
   (a) a first annular portion of one of said top and bottom walls of said fluid-emitting annular ring is porous,
   (b) a second annular, porous portion of said one wall of said fluid-emitting annular ring is radially spaced from said first annular portion,
   (c) said first and second annular portions of said one wall of said fluid-emitting annular ring are located in a single plane and define two separate, radially spaced fluid plenums,
   (d) said first annular portion of said one wall has a predetermined porosity that is different from the porosity of said second annular portion, and
   (e) each of said fluid plenums is separately fed from a different source of fluid,
   whereby different fluids may be fed into said two plenums and/or the rate of flow of fluid from said two plenums through said first and second annular portions of said one wall of said fluid-emitting annular ring may be selectively and separately varied.

38. The fluid diffuser of claim 37 in which the predetermined porosity of said first annular poration of said one wall of said fluid-emitting annular ring is greater than the porosity of said second annular portion of said wall.

39. The fluid diffuser of claim 38 in which said second annular portion of said one wall of said fluid-emitting annular ring is located radially outward of said first annular portion of said wall.

* * * * *